United States Patent [19]

Hayssen

[11] Patent Number: 5,400,334
[45] Date of Patent: Mar. 21, 1995

[54] MESSAGE SECURITY ON TOKEN RING NETWORKS

[75] Inventor: Carl G. Hayssen, Andover, Mass.

[73] Assignee: Ungermann-Bass, Inc., Santa Clara, Calif.

[21] Appl. No.: 105,207

[22] Filed: Aug. 10, 1993

[51] Int. Cl.6 .............................................. H04J 3/02
[52] U.S. Cl. ................................ 370/85.4; 370/85.5; 370/94.1; 380/9; 380/23
[58] Field of Search ............... 370/85.4, 85.5, 94.3, 370/94.1; 379/95; 380/6, 9, 23, 48

[56] References Cited

U.S. PATENT DOCUMENTS

| | | | |
|---|---|---|---|
| 4,901,348 | 2/1990 | Nichols et al. | 380/6 |
| 5,124,984 | 6/1992 | Engel | 370/94.1 |
| 5,161,192 | 11/1992 | Carter et al. | 380/48 |
| 5,177,788 | 1/1993 | Schanning et al. | 380/23 |
| 5,251,203 | 10/1993 | Thompson | 370/94.3 |
| 5,311,593 | 5/1994 | Carmi | 380/23 |

*Primary Examiner*—Douglas W. Olms
*Assistant Examiner*—Russell W. Blum
*Attorney, Agent, or Firm*—Townsend and Townsend Khourie and Crew

[57] ABSTRACT

Two message security methods and apparatus for the same for token ring local area networks. According to a first method, a port in a ring central controller examines the source and destination addresses of a received data packet and stores a received data packet and replaces the data portion with unrelated data bits only if the address does not match that of the attached user station. In another embodiment, the port scrambles the data portion of the received data packet if the addresses do not match.

12 Claims, 4 Drawing Sheets

MESSAGE SECURITY ON TOKEN RING NETWORKS

BACKGROUND OF THE INVENTION

The present invention relates to secured data transmission in multiuser computer architectures. More particularly, the present invention relates to prevention of unauthorized access to data communicated on local area networks.

A local area network (LAN) is a communications link between independent data processing equipment located within a moderately sized geographic area. LANs connect personal computers, mini- and mainframe computers, as well as peripheral devices such as hard disks and printers, implementing a concept that permits programs, data files, and resources to be shared throughout the network. Devices attached to a network are commonly referred to as stations. All stations on the LAN are interconnected via a cabling system, which includes the wire or cable that interconnects the devices and any attachment units needed to attach the device to the cable.

A characteristic common to all LANs is that all stations must share access to a single physical transmission medium. Several methods have been developed to control the sharing of access to the transmission medium. With networks that employ a ring or a star-wired topology, the most commonly used access method is token passing. Token passing involves the passing of a special transmission frame, called the token, from one station to the next around the ring. When a network station receives the token, that station is allowed to transmit.

Token ring is a broadcast network in that all stations on a ring can listen to all packets transmitted on that ring. Sensitive and valuable user data is thus available to eavesdropping reception by any station connected to the LAN. The security threat by eavesdroppers has become increasingly credible as LAN equipment, personal computers, and portable network diagnostic equipment prices continue to drop, thereby making the equipment to eavesdrop readily available. Eavesdropping is also simpler to implement and more difficult to detect than in the past because LAN networks can now be interconnected with the same wiring systems used for telephones rather than the specialty cables required under other, earlier standards.

Because the token must pass through all stations, merely suspending transmission of data to stations that are not authorized to receive the data is not an option in a token ring network. Similarly, a concentrator at the hub of a star wired ring can not simply alter the outgoing packets since the data coming back from a station must be transmitted to the next station.

From the foregoing it can be appreciated that there is a need for an effective message security system for token ring networks that does not adversely affect the integrity of network messages.

SUMMARY OF THE INVENTION

The present invention provides a method and an apparatus for countering the eavesdropping threat on token ring networks. Broadly, the present invention provides information security over a transmission medium in a star-wired ring network by storing the information field of a data packet at a central controller and replacing it with unrelated data bits when the address of the station does not match the destination address of the data packet. Alternatively, the present invention provides security by replacing the information by a scrambled version of it at the central controller, when the address of the station does not match the destination address of the data packet.

According to one embodiment, the present invention provides a method for securing data on a local area network with a token passing media access system, having a number of stations coupled to in a ring and to a multiport central controller. The method includes the steps of receiving at the central controller a data packet having a destination address, a source address, and a data field, from a first station; storing the contents of the data field at the central controller and replacing it with a substitute bit pattern to form a secured data field; and transmitting the data packet with the stored data field reinserted only if the address of the next station equals either the destination or the source address.

In another embodiment, the present invention provides an alternate method for securing data on a local area network with a token passing media access system. The network includes a number of stations coupled in a ring and to a multiport central controller. The method includes the steps of receiving at the central controller a data packet having a destination address, a source address, and a data field, from a first station; scrambling the contents of the packet data field at the central controller to form a secured data field; and transmitting the data packet with the scrambled data field content descrambled only if either the destination or source address equals the address of the next station the data packet is to be transmitted to.

A further understanding of the nature and advantages of the present invention may be gained with reference to the description and diagrams below.

DESCRIPTION OF THE SPECIFIC EMBODIMENTS

Figure 1:
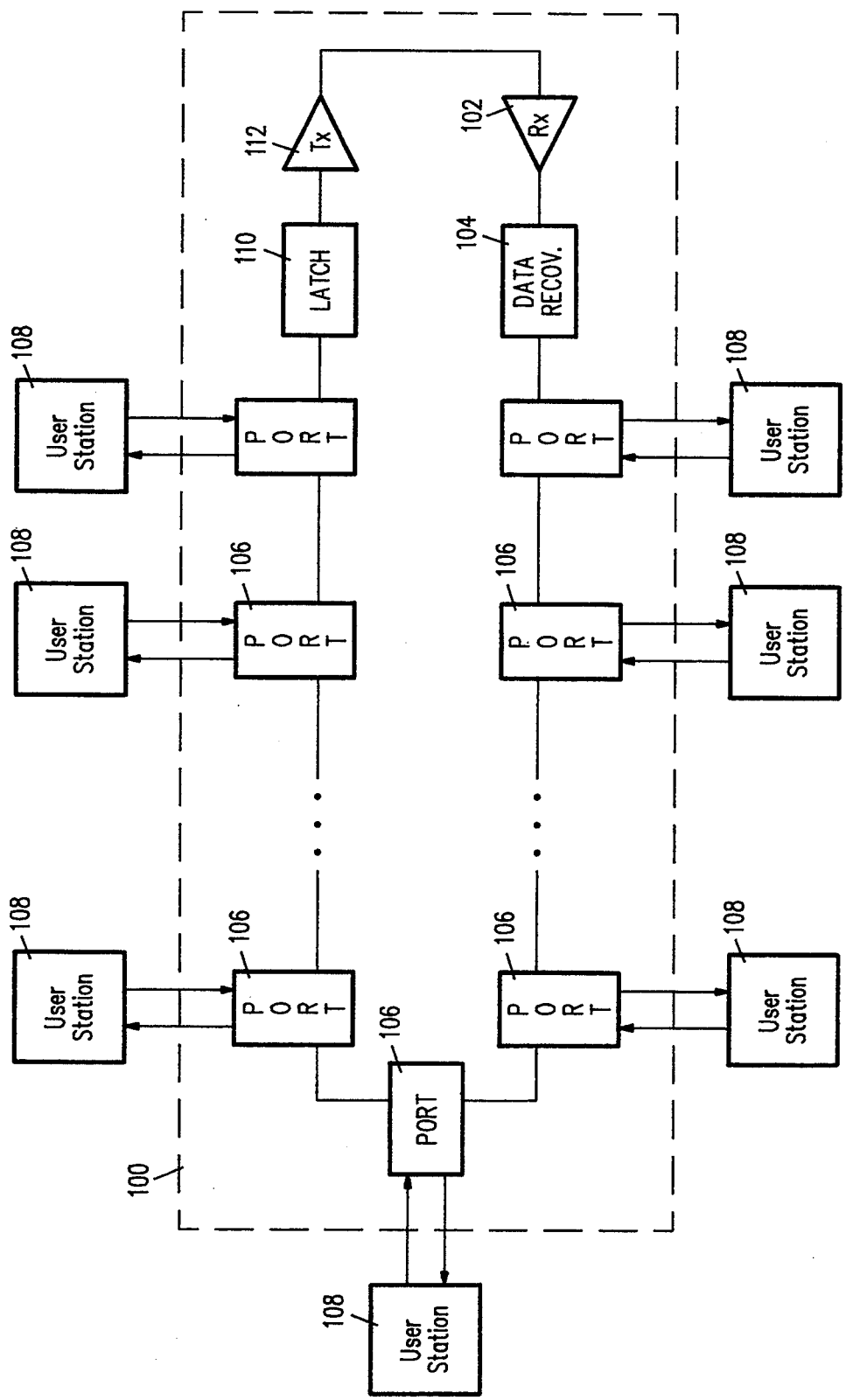
FIG. 1 is an illustrative diagram of a star-wired token ring network.

The present invention is implemented in a central controller (also referred to as a concentrator or a hub) of a star-wired token ring network. FIG. 1 shows a token ring network structure that implements a logical ring using a physical star topology. A concentrator 100 includes a receiver 102 at the ring input, followed by a data recovery block 104. The output of data recovery block 104 connects to a port 106 that facilitates communication between the ring and a user station 108. A plurality of serially connected ports 106 provide for connecting a plurality of user stations 108 to the network. In the network of the present invention only one station 108 connects to each port 106. The last port 106 on the ring connects to a transmitter 112 at the ring output through a latch 110.

Receiver 102 and data recovery block 104 at the input of the ring, and latch 110 and transmitter 112 at the output of the ring allow the ring to connect to other rings in a larger network. Data packets are passed from one station 108 to the next through concentrator 100 in physical sequence along the ring. Each station 108 transmits the data packet to concentrator 100, which in turn transmits it back to the next station 108 on the ring through a port 106. The function of concentrator 100 is to actively monitor and control data transmission over the ring.

The right to transmit data packets is controlled by a special transmission frame, called the token, which is passed from one station 108 to the next in a similar fashion as a data packet. When a station 108 receives the token, it is allowed to transmit data packets until a predetermined time limit is reached. A token with a configuration that indicates the right to transmit is called a free token. When a station 108 receives a free token and has data to transfer, it changes the configuration of the token to that of a busy token and includes the busy token as part of each data packet it then transmits. The data packets travel from station to station around the ring going through concentrator 100. Each station 108 that receives a data packet checks the address in the data packet to determine if it should process that data packet. In either case, it sends the data packet back to concentrator 100 to be transmitted to the next station. When a data packet returns to the station that originally sent it (i.e. source station), that station removes the data packet from the network and transmits a free token to the next station through concentrator 100.

Figure 2A:
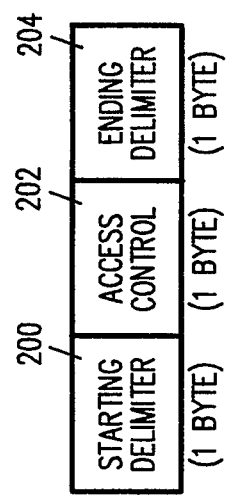
FIGS. 2A and 2B show the frame formats for a free and a busy token according to IEEE standards 802.5, respectively.
Figure 2B:
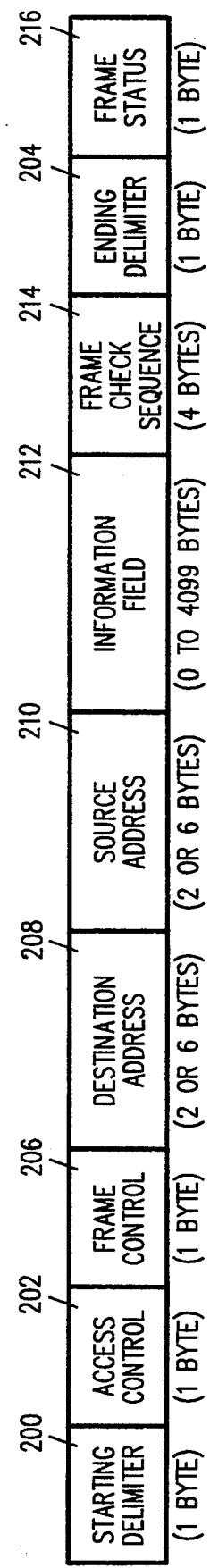

FIGS. 2A and 2B show the frame formats for a free and a busy token according to IEEE standard 802.5, respectively. A one-byte starting delimiter 200 identifying the start of a frame with a unique signal pattern is followed by a one-byte access control field 202 which indicates whether the frame is a data frame (i.e. a busy token) or a free token. A frame control field 206 identifies the type of frame information, and for certain control frames, the particular function to be performed. A two- or six-byte destination address field 208 indicates the station (or stations) for which the data frame is destined, and a two- or six-byte source address frame 210 identifies the original station sending the data frame. An information field 212, which may be 0 to N bytes long (where N is determined by the specific ring parameters), contains either protocol data or control information. The information is followed by a four-byte frame check sequence field 214 which assists in error detection. An ending delimiter 204 identifies the end of the frame with a unique signal pattern similar to starting delimiter 200. Ending delimiter 204 also contains bits used to identify whether or not this is the last frame in a multiframe transmission and whether an error has already been detected by some other station. The frame ends with a one-byte frame status field 216 which contains address-recognized and frame-copied bits that are used to indicate whether or not a frame was successfully received by a destination station.

Figure 3:
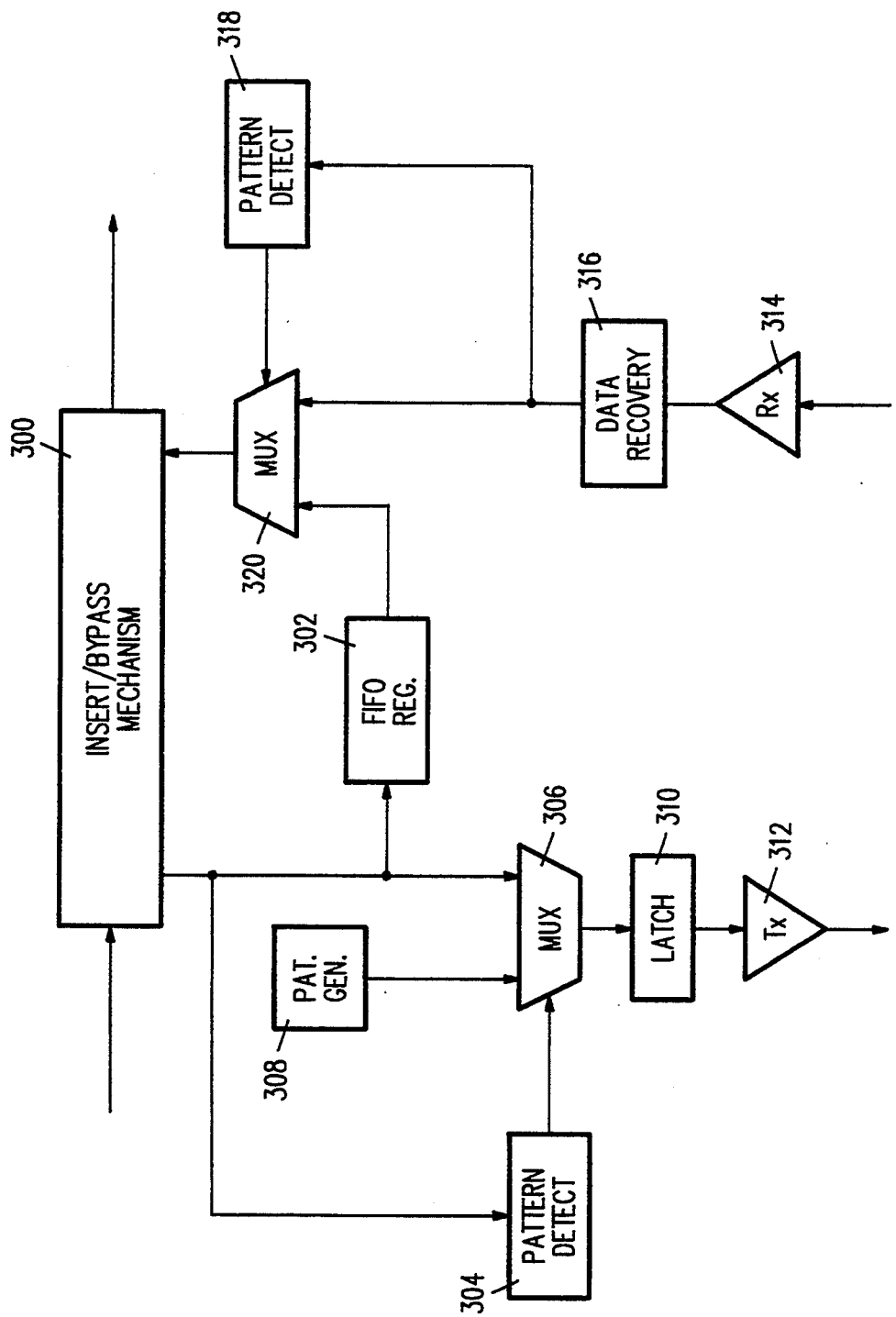
FIG. 3 is a block diagram of a port electronics for a network controller according to a first embodiment of the present invention.

FIG. 3 shows a block diagram of a port 106 circuit according to one embodiment of the present invention. The data from a preceding port 106 on the ring arrives at an input of an insert/bypass mechanism block 300. The data is then routed to an input of a first-in-first-out (fifo) register 302, an input of a pattern detector 304 and one input of a multiplexer (MUX) 306. The output of pattern generator 304 controls the select input of MUX 306. An output of a pattern generator 308 connects to a second input of MUX 306. The data at the output of MUX 306 is transmitted to the station (not shown) attached to the port via latch 310 and transmitter 312. On the receive side, a receiver 314 and data recovery block 316 receive data form the attached station and feed it to the inputs of a pattern detector 318 and a MUX 320. The other input of MUX 320 connects to an output of fifo register 302, while the output of pattern generator 318 controls the select input of MUX 320. The data at the output of MUX 320 goes on to the next port via the insert/bypass mechanism block 300.

In operation, the data packet arriving at the port input is first stored in fifo register 302. Pattern detector 304 detects the destination address portion of the data packet and compares it to the address of the attached station. In case of matching addresses, the output of pattern detector 304 selects that input of MUX 306 that connects to the received data packet. Thus, the data packet arriving at the port is transmitted to the station unchanged. However, if pattern detector 304 determines that the destination address of the data packet does not match the address of the attached station, the data at the other input to MUX 306 is transmitted. The other input of MUX 306 connects to the output of pattern generator 308. Pattern generator 308 generates a substitute data packet unrelated to the received data packet (e.g. random data). The attached station is, therefore, prevented from accessing data on the ring that is not addressed to it. For proper operation of the ring, only the information field of the data packet is altered. Starting delimiter, access control and frame control bytes, as well as source and destination addresses remain the same (FIGS. 2A and 2B). A token is also left unchanged. To prevent the attached station from processing the packet and incrementing it's count of packets received with error, pattern generator 308 sets the error bit in the ending delimiter portion of the substitute data packet. The ending delimiter otherwise remains intact.

Before the port transmits the data packet to the next station, the original information must be recovered. This is accomplished by the receive path of port 106. After going through receiver 314 and data recovery block 316, the data from the attached station is applied to one input of MUX 320 as well as an input of pattern detector 318. Similar to the transmit path, pattern detector 318 detects the data packet address field and determines whether the data arriving from the station is a substitute data packet or the original. In case of a substitute data packet, MUX 320 selects the contents of fifo register 302 to be transmitted to the output of port 106. This way the original data packet which was stored in fifo register 302 is reinserted in the data path. If pattern detector 318 determines that the attached station is transmitting an original data packet, MUX 320 selects the input connected to the data recovery block 316. Therefore, the data packet leaving port 106 is uncorrupted.

Figure 4:
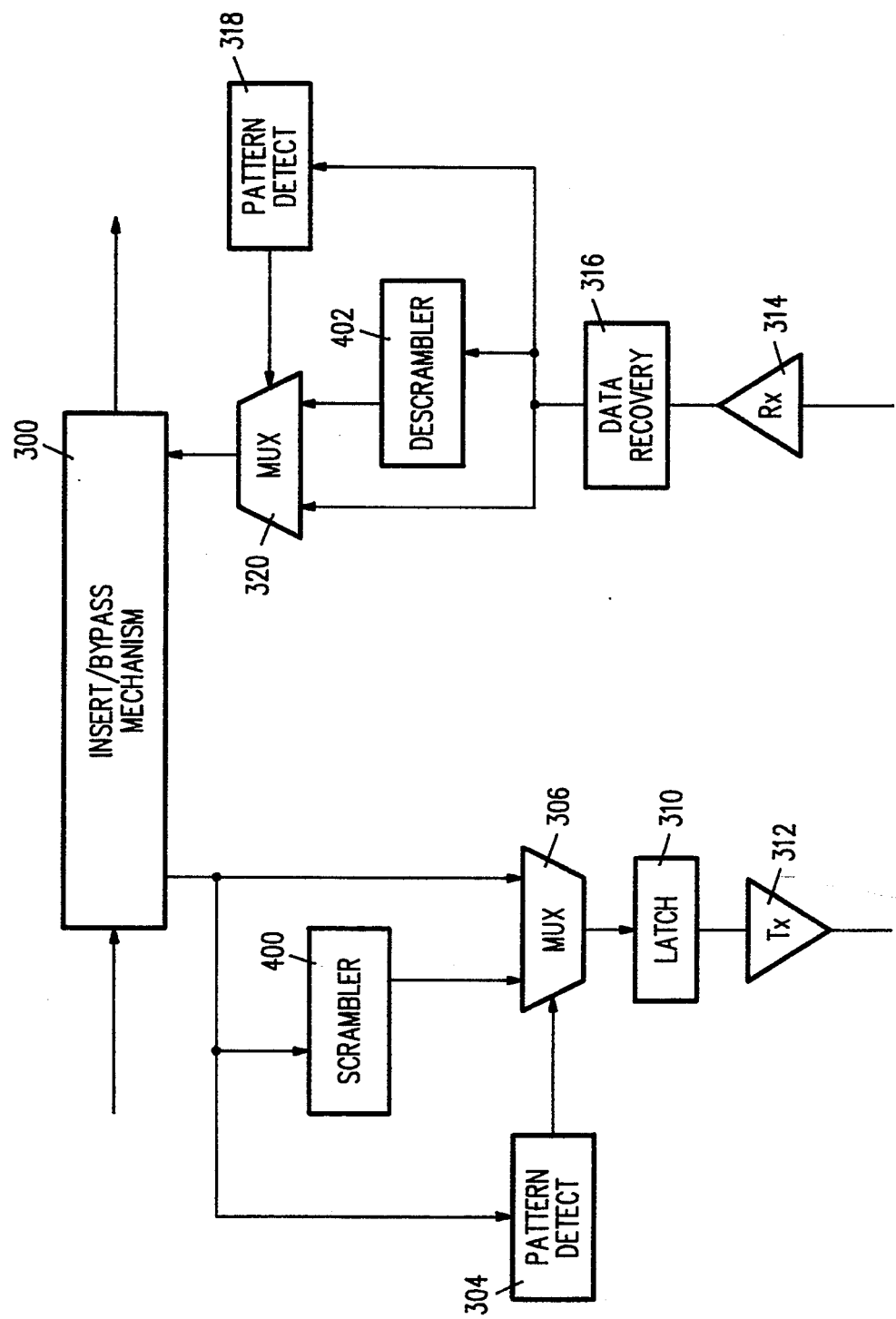
FIG. 4 is a block diagram of a port electronics for a network controller according to a second embodiment of the present invention.

FIG. 4 shows a block diagram of a port 106 according to another embodiment of the present invention. Instead of storing and replacing an original data packet, port 106, according to the second embodiment, scrambles (or encrypts) the received data in such a way that it can be descrambled. The data is then descrambled to recover the original data before transmission to the next port. Accordingly, this port circuit is similar to that shown in FIG. 3 except that instead of a pattern generator, a scrambler 400 feeds an input of MUX 306. Scrambler 400 receives at its input the data arriving at port 106 via insert/bypass mechanism 300. Similarly, on the receive path of port 106, a descrambler 402 receives the data from the station and drives an input of MUX 320. Pattern generator 308 and fifo register 302 are not required in this embodiment.

The basic operation and data flow in the port circuit of FIG. 4 is similar to that of the port circuit of FIG. 3. By comparing the destination address field in the received data packet with the address of the attached station, pattern detector 304 determines whether MUX 306 transfers the original information field form the data packet or a scrambled version of it. On the receive side, pattern detector 318 determines whether descrambling is required. If so, MUX 320 transfers the data at its input connected to descrambler 402 output. Otherwise, MUX 320 transmits original data out to the port output through insert/bypass mechanism 300. Only those packets with destination and source addresses not equal to the address of the attached station can be scrambled. Therefore, broadcast, multicast and media access control (MAC) layer packets should not be scrambled.

This embodiment provides the option of varying the degree of protection. The encryption method can be selected depending on the level of security desired. For simple eavesdropping protection, simple scrambling may be sufficient. For more security, full encryption using any technique applicable to a serial bit stream may be used.

As in the first embodiment, the starting delimiter, access control, frame control, source and destination addresses are not altered. These fields must remain uncorrupted to allow for proper ring operation.

In conclusion, the present invention provides two embodiments for message security on a token ring local area network. Each user station is attached to a port inside a central controller. A data packet being sent out a port to a station is examined. If neither the source nor destination address of the packet matches the address of the attached station, the data portion of the packet is replaced by a like number of data bits unrelated to the actual data in the first embodiment, and replaced by an encrypted version in the second embodiment.

While the above is a complete description of the specific embodiments of the present invention, it is possible to use various alternatives, modifications and equivalents. For example, qualifiers other than source/destination address may be used to decide whether or not a packet is to be secured. A similar message security method as that disclosed by the present invention may be used to secure (e.g. scramble), for example, packets of a certain protocol type only. Therefore, the scope of the present invention should be determined not with reference to the above description but should, instead, be determined with reference to the appended claims, along with their full scope of equivalents.

What is claimed is:

1. In a token ring local area network having at least one central controller with at least one port, each port coupling to a user station, a method for securing data on the network comprising the steps of:
    (a) receiving, at a port, a data packet from the ring having at least a destination address, a source address, and a data field;
    (b) storing a content of said data field at said port;
    (c) examining a security qualifier portion of said data packet to determine whether said data packet is to be secured;
    (d) generating a substitute bit pattern; and
    (e) replacing said data field content with said substitute bit pattern to form a secured data packet in response to said examining step.

2. The method for securing data on a local area network as recited in claim 1, wherein said security qualifier portion of said data packet is said destination and source addresses, said examining step comparing said destination and source addresses with an address of a station attached to said port.

3. The method for securing data on a local area network as recited in claim 1, wherein said security qualifier portion of said data packet is a protocol data portion of said data field, said examining step determining a protocol type of said data packet.

4. The method of securing data on a local area network as recited in claim 1, further comprising the step of transmitting said data packet unaltered if a type of said data packet is one of broadcast, multicast or media access control frame.

5. The method of securing data on a local area network as recited in claim 1 further comprising the steps of:
    (f) transmitting said secured data packet to an attached user station;
    (g) receiving back at said port said secured data packet from said attached user station;
    (h) replacing said substitute bit pattern with said content of said data field stored at step (b) to form a restored data packet; and
    (i) transmitting said restored data packet onto the ring.

6. In a token ring local area network having at least one central controller with at least one port, each port coupling to a user station, a method for securing data on the network comprising the steps of:
    (a) receiving at a port a data packet from the ring having at least a destination address, a source address, and a data field;
    (b) storing a content of said data field at said port;
    (c) comparing said destination and said source address with an address of a station attached to said port;
    (d) generating a substitute bit pattern; and
    (e) replacing said data field content with said substitute bit pattern to form a secured data packet if said source or destination address does not match said address of said attached station.

7. The method for securing data on a local area network as recited in claim 6 further comprising the steps of:
    (f) transmitting said secured data packet to said attached station;
    (g) recovering said data packet by inserting said stored data field content in place of said substitute bit pattern in a data packet received from said station; and
    (h) transmitting said recovered data packet to a next port on said ring.

8. The method for securing data on a local area network as recited in claim 6, wherein said storing step stores said content of said data field in a first-in first-out fashion at a memory structure at said port.

9. The method for securing data on a local area network as recited in claim 6 wherein said generating step further comprises a step of setting an error bit in an ending delimiter of said data packet to prevent said station from processing said packet and incrementing a count of packets received with error.

10. In a central controller of a token ring local area network, a port circuit for providing data security on the network, comprising:

storage means coupled to receive from the ring a data packet having user data;

pattern detection means, coupled to receive from the ring a data packet having user data, said pattern detection means for comparing a destination and a source address of said data packet with an address of a station attached to the port;

pattern generator means for generating a substitute data pattern; and selection means, coupled to receive said data packet and coupled to said pattern generator means and said pattern detection means, for selecting said substitute data pattern to be transmitted to said station attached to the port if said data packet destination or source address does not match said station address.

11. A port circuit as recited in claim 10 further comprising:

second selection means, coupled to receive a data packet from said station attached to the port and coupled to said storage means, for selecting a contents of said storage means to be transmitted to a next station if said data packet includes said substitute data pattern.

12. In a central controller of a token ring local area network, a port circuit for providing data security on the network, comprising:

a pattern detector having an input for receipt from the ring of a data packet having user data, said pattern detector for comparing a destination and a source address of said data packet with an address of a station attached to the port;

storage means coupled to receive said data packet for storing said data packet;

a pattern generator for generating a substitute data pattern;

a first multiplexer having a first input for receipt of said data packet and a second input coupled to an output of said pattern generator, and a control input coupled to an output of said pattern detector, and an output coupled to said station attached to the port; and a second multiplexer having a first input coupled to an output of said storage means, a second input coupled to receive transmit data from said station attached to the port, a control input coupled to said output of said pattern detector, and an output coupled to the ring.

* * * * *

Adverse Decisions In Interference

Patent No. 5,400,334, Carl G. Hayssen, III, MESSAGE SECURITY ON TOKEN RING NETWORKS, Interference No. 103,992, final judgment adverse to the patentee rendered May 14, 1998, as to claims 1, 2, 5-8 and 10-12.

*(Official Gazette July 7, 1998)*